United States Patent
Schott et al.

(10) Patent No.: US 11,027,581 B2
(45) Date of Patent: Jun. 8, 2021

(54) SYSTEM TO INFLUENCE THE POSITION OF A VEHICLE

(71) Applicant: Deere & Company, Moline, IL (US)

(72) Inventors: Florian Schott, Bensheim (DE); Florian Reinmuth, Sinsheim (DE)

(73) Assignee: DEERE & COMPANY, Moline, IL (US)

(*) Notice: Subject to any disclaimer, the term of this patent is extended or adjusted under 35 U.S.C. 154(b) by 300 days.

(21) Appl. No.: 15/272,978

(22) Filed: Sep. 22, 2016

(65) Prior Publication Data
US 2017/0113497 A1     Apr. 27, 2017

(30) Foreign Application Priority Data
Oct. 23, 2015   (DE) ...................... 10 2015 220 743.9

(51) Int. Cl.
*B60C 23/02*   (2006.01)
*A01M 7/00*    (2006.01)
(Continued)

(52) U.S. Cl.
CPC ............ *B60C 23/002* (2013.01); *A01B 71/02* (2013.01); *A01D 75/28* (2013.01); *A01M 7/0057* (2013.01); *G01C 9/02* (2013.01)

(58) Field of Classification Search
CPC combination set(s) only.
See application file for complete search history.

(56) References Cited

U.S. PATENT DOCUMENTS

| 5,517,419 A | * | 5/1996 | Lanckton | ................. G01C 7/04 348/148 |
| 6,290,019 B1 | | 9/2001 | Kolassa et al. | |

(Continued)

FOREIGN PATENT DOCUMENTS

| DE | 1480185 B | 7/1970 |
| DE | 10214648 A1 | 10/2003 |

(Continued)

OTHER PUBLICATIONS

European Search Report in foreign counterpart application No. 16194732.0 dated Mar. 24, 2017 (5 pages).

(Continued)

*Primary Examiner* — Tyler J Lee
(74) *Attorney, Agent, or Firm* — Taft Stettinius & Hollister LLP; Stephen F. Rost

(57) ABSTRACT

A system for influencing a vehicle position when travelling along a subsurface includes a vehicle structure including left and right wheels, a tire inflation system for the supply of the corresponding tires of each individual wheel with a specified tire inflation pressure, and a sensor device for determining a transverse tilt of the vehicle structure with respect to the travelled subsurface. The sensor device is configured to provide a transverse tilt magnitude that reflects the determined transverse tilt and operably communicates it to a control unit. The control unit operably adapts the tire inflation pressure specified for the left and right wheels by controlling the tire inflation system in accordance with the transverse tilt magnitude in such a way that the vehicle structure is tilted in the sense of a reduction of the determined transverse tilt with respect to the travelled subsurface.

9 Claims, 2 Drawing Sheets

(51) Int. Cl.
*A01D 75/28* (2006.01)
*A01B 71/02* (2006.01)
*G01C 9/02* (2006.01)
*B60C 23/00* (2006.01)

(56) References Cited

U.S. PATENT DOCUMENTS

| | | | |
|---|---|---|---|
| 10,160,269 B2 * | 12/2018 | Staedele | B60C 23/003 |
| 10,384,537 B2 * | 8/2019 | Flogard | B60K 17/35 |
| 2013/0091819 A1 | 4/2013 | Deneault et al. | |
| 2014/0184403 A1 * | 7/2014 | Kosugi | B60C 23/0416 |
| | | | 340/447 |
| 2014/0343802 A1 | 11/2014 | Pichlmaier | |
| 2016/0355187 A1 * | 12/2016 | Nothdurft | A01B 79/005 |
| 2017/0120695 A1 * | 5/2017 | Staedele | B60C 23/0484 |
| 2017/0361707 A1 * | 12/2017 | Flog rd | B60K 17/3505 |

FOREIGN PATENT DOCUMENTS

| | | |
|---|---|---|
| DE | 10227484 A1 | 2/2004 |
| DE | 10329937 A1 | 2/2005 |
| DE | 60130611 T2 | 7/2008 |
| DE | 112009003587 T5 | 5/2012 |
| WO | 2010071489 A1 | 6/2010 |
| WO | WO-2010071489 A1 * | 6/2010 ........... B60C 23/002 |

OTHER PUBLICATIONS

DE Search Report issued in counterpart application No. DE102015220743.9, dated Jun. 10, 2016 (9 pages).
S690 HillMaster Combine Operator's Manual, John Deere Harvester Works, 32 pages.
5660 HTS Climber, Deutz-Fahr, 10 pages.
S690 HillMaster Combine Operator's Manual, John Deere, publicly available before Feb. 2015, 32 pages.
5660 HTS Climber, Deutz-Fahr, publicly available before Feb. 2015, 10 pages.
German Search Report, Application No. 10 2015 200 743.9, German Patent and Trademark Office, 9 pages, dated Jun. 15, 2016.

* cited by examiner

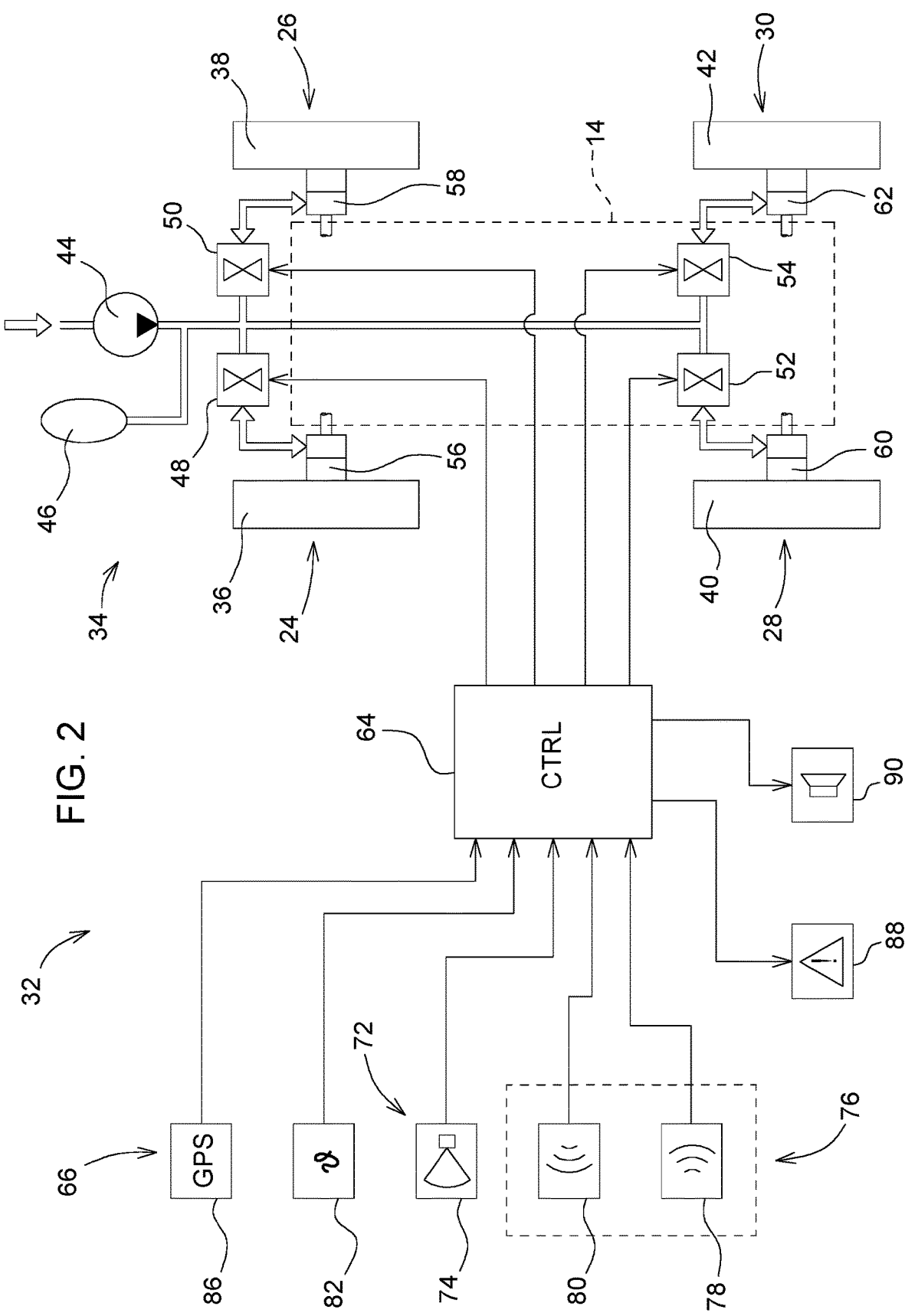

SYSTEM TO INFLUENCE THE POSITION OF A VEHICLE

RELATED APPLICATIONS

This application claims the benefit of German Application Ser. No. 102015220743.9, filed on Oct. 23, 2015, the disclosure of which is hereby expressly incorporated by reference in its entirety.

FIELD OF THE DISCLOSURE

The present disclosure relates to a system for influencing the position of a vehicle, and in particular to a system for influencing the position of a vehicle when travelling on an inclined subsurface with a vehicle structure including left and right wheels and a tire inflation system for the individual supply of the corresponding tires with a specified tire inflation pressure.

BACKGROUND

A conventional system for the tilt stabilization of a work vehicle, when travelling along an inclined slope, an appropriate vehicle structure going up a slope is inclined with respect to the subsurface and thus against an existing tilt tendency of the work vehicle by the creation of a corresponding pressure difference between the left and right tires of the work vehicle. A use of the conventional system in agriculture is not readily possible since the transverse tilt of the vehicle structure produced in the course of the tilt stabilization with respect to the subsurface is problematic for the use of many agricultural work tools.

SUMMARY

In one embodiment of the present disclosure, a system to influence a vehicle position, in particular when travelling on an inclined subsurface, includes a vehicle structure with left and right tires and a tire inflation system for the individual supply to the corresponding tires with a specified tire inflation pressure. A sensor device determines a transverse tilt of the vehicle structure with respect to a travelled subsurface or one that is to be travelled on, and makes available a transverse tilt magnitude that reflects the determined transverse tilt. The transverse tilt magnitude that is made available is sent to a control unit. The control unit adapts the tire inflation pressure specified for the left and right tires by control of the tire inflation system in accordance with the delivered transverse tilt magnitude in such a way that the vehicle structure is tilted vis-a-vis the travelled subsurface or the one to be travelled on in the sense of a reduction of the determined transverse tilt.

The system takes into account the circumstance that when travelling along a slope, the vehicle structure has an increased tendency to tilt down the slope. This is the case not only when using sprung wheel suspensions, but particularly when travelling on a soft or yielding subsurface, since the tires aimed down the slope sink deeper than the tires aimed up the slope. In order to counteract such a tilt tendency of the vehicle structure, the control unit therefore determines whether the deviation of the parallel position of the vehicle structure, represented by the transverse tilt magnitude, is within a permissible tolerance range with respect to the subsurface. If this is not the case, then the control unit, by means of a corresponding control of the tire inflation pressure system, causes an increase in the tire inflation pressure on the side aimed down the slope or a decrease of the tire inflation pressure on the side aimed up the slope, so that the vehicle structure is tilted up the slope for the reduction of the transverse tilt. This process takes place until the deviation from the parallel position, derived from the transverse tilt magnitude (which is continuously updated by the sensor device for this purpose) is again within its permissible tolerance range.

A use of the system arises, in particular, in connection with agricultural tractors, since the maintenance of the parallel position is a prerequisite for a satisfactory functioning for many of the attachable agricultural work tools. This is particularly true when using a field sprayer or a fertilizer spreader attached to the agricultural tractor, since only then is the spray agent or spreading material uniformly delivered to the field surface.

With regard to the sensor device, different developments are conceivable. If the subsurface to be travelled on should be anticipatorily included, then the device can include imaging sensor means such as a laser scanner, a stereo camera or the like which scan the subsurface course ahead and, from the image data obtained, determine the transverse tilt of the vehicle structure with respect to the scanned subsurface section. An anticipatory inclusion of the subsurface to be travelled has the advantage that the low reactivity of the tire inflation system can be taken into consideration to the extent that the tire inflation pressure can already be initiated early before reaching the scanned subsurface section, and there is sufficient time for the carrying out of the filling and emptying process.

If excessively high demands are not made of the control accuracy of the system, then, for the sake of simplicity, an inclusion of the currently travelled subsurface can also take place by means of distance-detecting sensor agents included by the sensor device. The sensor device may have, for example, two ultrasound or radar sensors separately arranged in the transverse direction of the vehicle structure, whose detection range is oriented in the direction of the subsurface section running below the vehicle structure. By a differentiation of the individual distances detected by means of the ultrasound or radar sensors, it is then possible to determine the transverse tilt of the vehicle structure with respect to the subsurface travelled.

If a direct detection of the subsurface course is not possible, then it is conceivable that the sensor device has a tilt sensor correlated with the vehicle structure in order to detect a first absolute transverse tilt of the vehicle structure with respect to the earth horizontal. For making the transverse tilt magnitude available, this second absolute transverse tilt of the travelled subsurface determined from position-dependent geo-information of a satellite-supported navigation system is related to the earth horizontal. The tilt sensor correlated with the vehicle structure can work, for example, according to the gyroscopic principle. Since most modern agricultural tractors have satellite-supported navigation systems, low-cost shared use is a possibility.

In order to inform the driver regarding critical driving situations, it is possible for the control unit to bring about the release of driver information if the determined transverse tilt exceeds the tilt of the vehicle structure that can be attained by an adaptation of the tire inflation pressure and that therefore an increased tilt risk exists. The release of the driver information is carried out, for example, by the control of a display or an acoustic warning unit.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 2 is a block diagram of one embodiment of a system to influence the position of the vehicle of FIG. 1.

DETAILED DESCRIPTION

Figure 1:
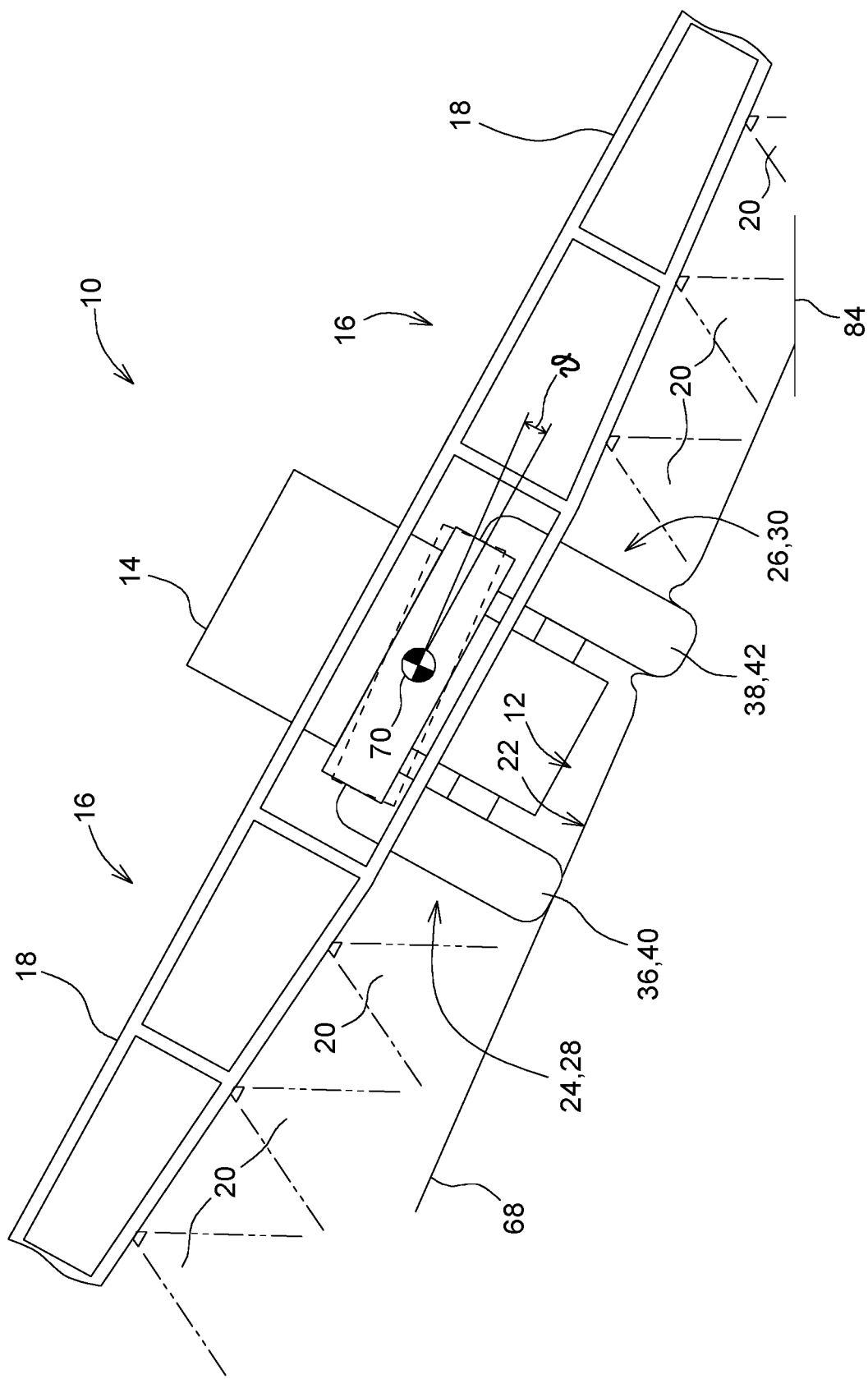
FIG. 1 is a schematic of a vehicle designed as an agricultural tractor while travelling along a slope.

In a first embodiment, the vehicle is an agricultural tractor 10, which travels along a slope 12 and carries an agricultural work tool, which is attached on a vehicle structure 14, in the rear, in the form of a field sprayer 16 with a spraying rod 18, which extends to the side, so as to deliver a spray agent 20 to the surface of a field 22.

The vehicle structure 14 has left and right front wheels 24, 26 and left and right rear wheels 28, 30. A steering lock, which can be adjusted on the left and right front wheels 24, 26, can be influenced by the driver by means of a steering system (not shown) included by the agricultural tractor 10.

In accordance with FIG. 2, the system 32 has a central tire inflation system 34. The central tire inflation system 34 permits a supply to the corresponding tires 36, 38, 40, 42 of each individual wheel with a specified tire inflation pressure. The central tire inflation system 34 includes, for this purpose, an air compressor 44 designed as a screw compressor to supply a compressed air reservoir 46 and control valves 48, 50, 52, 54, correlated with the tires 36, 38, 40, 42, which via intermediate rotating passages 56, 58, 60, 62, permit a filling and emptying of the pertinent tire 36, 38, 40, 42. For the control of the air compressor 44 and the control valves 48, 50, 52, 54, a microprocessor-guided control unit 64 is used.

A sensor device 66 determines a transverse tilt of the vehicle structure 14 with respect to the travelled subsurface 68 or one to be travelled on and provides the transverse tilt magnitude that reflects the determined transverse tilt which is sent on to the control unit 64 for further evaluation.

In accordance with FIG. 1, the vehicle structure 14 has a tendency to tilt down the slope. This is not only the case with the use of sprung wheel suspensions, but rather it occurs also precisely when travelling on a soft or yielding subsurface 68 (for example, the field surface 22 to be worked on), since the wheels 26, 30 aimed downward sink deeper than the wheels 24, 28 aimed up the slope. This causes the vehicle structure 14 and also the spraying rod 18 to tilt with respect to the subsurface 68. Consequently, the required parallel orientation of the vehicle structure 14 is no longer achieved. This can lead to a nonuniform delivery of the spray agent 20 to the field surface 22.

In order to counteract such a tilt tendency of the vehicle structure 14, the control unit 64 determines whether the deviation of the parallel position of the vehicle structure 14, represented by the prepared transverse tilt magnitude with respect to the subsurface 68, lies within a permissible tolerance range. If this is not the case, then by a corresponding control of the central tire inflation system 34 or the control valves 48, 50, 52, 54 correlated with it, the control unit 64 causes an increase in the tire inflation pressure on the side aimed down the slope or a reduction of the tire inflation pressure on the side aimed up the slope so that the vehicle structure 14 is tilted up the slope for the reduction of the transverse tilt around its center of gravity 70. This filling or emptying process takes place until the deviation from the parallel position, derived from the transverse tilt magnitude once again lies within a permissible tolerance range. The transverse tilt magnitude is continuously updated, for this purpose, by the sensor device 66.

Generally speaking, the control unit 64 adapts the tire inflation pressure specified for the left and right wheels 24, 26, 28, 30 by controlling the central tire inflation system 34 in accordance with the supplied transverse tilt magnitude in such a way that the vehicle structure 14 is tilted in the sense of a reduction of the determined transverse tilt with respect to the travelled subsurface 68 or the one to be travelled on.

The sensor device 66 is designed in different ways depending on the demands made of the system 32.

If the subsurface 68 to be travelled on is to be anticipatorily included, then the sensor device 66 includes an imaging sensor means 72 in the form of a laser scanner or a stereo camera 74. The laser scanner or the stereo camera 74 is attached to the front area of the agricultural tractor 10 so as to scan the subsurface course ahead and to determine, from the image data obtained, the transverse tilt of the vehicle structure 14 with respect to the scanned subsurface section. The anticipatory inclusion of the subsurface 68 to be travelled on permits the low reactivity of the central tire inflation system 34 to be taken into consideration to the extent that the adaptation of the tire inflation pressure is already initiated early before reaching the scanned substrate section and sufficient time remains for the carrying out of the filling or emptying process. Optionally, by means of the laser scanner or the stereo camera 74, a determination of the subsurface characteristics is carried out by the evaluation of the characteristic reflection characteristics of the top of the subsurface. This permits, among other things, an estimate of the extent of a sinking of the wheels 26, 30 of the agricultural tractor 10 aimed down the slope, and the varying in a corresponding manner of the initiation point of the filling or the emptying process.

If excessively high demands are not made of the control accuracy of the system 32, then alternatively, an inclusion of the currently travelled subsurface 68 is carried out by distance-determining sensor means 76 included by the sensor device 66. They have two ultrasound or radar sensors 78, 80 located separately in the tilt direction of the vehicle structure 14, whose detection range is oriented in the direction of a subsurface section that runs below the vehicle structure 14. The sensor device 66 hereby determines the transverse tilt of the vehicle structure 14 with respect to the subsurface 68 by a differentiation of individual distances detected in such a manner.

If a direct detection of the subsurface course is not possible, then the sensor device 66 alternatively has a tilt sensor 82 correlated with the vehicle structure 14 for the detection of a first absolute transverse tilt of the vehicle structure 14 with respect to the earth horizontal 84, wherein for the preparation of the transverse tilt magnitude it is compared with or related to this second absolute transverse tilt of the travelled subsurface 68 with respect to the earth horizontal 84 determined from the positive-dependent geo-information of a satellite-supported navigation system 86. The tilt sensor 82 correlated with the vehicle structure 14 hereby works according to the gyroscopic principle. The determination of the transverse tilt is thus finally carried out on the basis of a differentiation of the two absolute transverse tilts.

In order to inform the driver regarding critical driving situations, the control unit 64 also brings about the release of driver information if the determined transverse tilt exceeds the tilting of the vehicle structure 14 that can be attained by adaptation of the tire inflation pressure and there is thus an increased tilt risk. The release of the driver information is thereby carried out by the control of a display 88 or an acoustic warning unit 90.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A system for influencing a vehicle position when travelling along an inclined subsurface, comprising:
   a vehicle structure including left and right wheels;
   a tire inflation system for the supply of the corresponding tires of each individual wheel with a specified tire inflation pressure; and
   a sensor device for determining a transverse tilt of the vehicle structure with respect to the travelled inclined subsurface, the sensor device configured to provide a transverse tilt magnitude that reflects the determined transverse tilt and operably communicates it to a control unit, wherein the transverse tilt magnitude is a deviation of a parallel position of the vehicle structure as measured relative to a center of gravity of the vehicle structure;
   wherein the control unit operably adapts the tire inflation pressure specified for either the left or the right wheels by controlling the tire inflation system in accordance with the transverse tilt magnitude in such a way that the vehicle structure is tilted in the sense of a reduction of the determined transverse tilt in accordance with a permissible tolerance range with respect to the travelled inclined subsurface.

2. The system of claim 1, wherein the sensor device includes an imaging sensor means for determining an anticipatory transverse tilt of the vehicle structure with respect to a subsurface to be travelled on, and including the anticipatory transverse tilt with the determined transverse tilt.

3. The system of claim 1, wherein the sensor device includes a distance-detecting sensor means for determining a current transverse tilt of the vehicle structure with respect to a subsurface currently being travelled on, and including the current transverse tilt with the determined transverse tilt.

4. The system of claim 1, wherein the sensor device includes a tilt sensor coupled to the vehicle structure for operably detecting a first absolute transverse tilt of the vehicle structure with respect to the earth horizontal;
   further wherein, in order to provide the transverse tilt magnitude, it is related with an absolute transverse tilt of the subsurface travelled on with respect to the earth horizontal which is determined from the position-dependent geo-information of a satellite-supported navigation system.

5. The system of claim 1, wherein the control unit operably communicates driver information if the determined transverse tilt exceeds the tilting of the vehicle structure which is attainable by adaptation of the tire inflation pressure.

6. The system of claim 1, wherein the left wheels include a front left wheel and a rear left wheel, and wherein the right wheels include a front right wheel and a rear right wheel.

7. The system of claim 1, wherein the control unit operably increases the tire inflation pressure specified for either the left wheels or the right wheels for the wheels on a side of the vehicle structure aimed down a slope of the inclined subsurface.

8. The system of claim 1, wherein the control unit operably decreases the tire inflation pressure specified for either the left wheels or the right wheels for the wheels on a side of the vehicle structure aimed up a slope of the inclined subsurface.

9. The system of claim 1, further wherein the control unit operably adapts the tire inflation pressure specified for both the left and the right wheels by controlling the tire inflation system.

\* \* \* \* \*